(12) United States Patent
Sundholm

(10) Patent No.: US 9,446,915 B2
(45) Date of Patent: Sep. 20, 2016

(54) SEPARATING DEVICE AND METHOD FOR A PNEUMATIC MATERIAL CONVEYING SYSTEM

(71) Applicant: MARICAP OY, Vantaa (FI)

(72) Inventor: Göran Sundholm, Tuusula (FI)

(73) Assignee: MARICAP OY, Vantaa (FI)

( * ) Notice: Subject to any disclaimer, the term of this patent is extended or adjusted under 35 U.S.C. 154(b) by 107 days.

(21) Appl. No.: 14/352,082

(22) PCT Filed: Oct. 8, 2012

(86) PCT No.: PCT/FI2012/050964
§ 371 (c)(1),
(2) Date: Apr. 16, 2014

(87) PCT Pub. No.: WO2013/057366
PCT Pub. Date: Apr. 25, 2013

(65) Prior Publication Data
US 2014/0270997 A1    Sep. 18, 2014

(30) Foreign Application Priority Data

Oct. 17, 2011 (FI) ........................................ 20116024

(51) Int. Cl.
*B65G 53/00* (2006.01)
*B65G 53/60* (2006.01)
(Continued)

(52) U.S. Cl.
CPC ................. *B65G 53/60* (2013.01); *B04C 5/04* (2013.01); *B04C 5/13* (2013.01); *B65F 5/005* (2013.01)

(58) Field of Classification Search
USPC .......................... 406/151, 157, 163, 173, 197
See application file for complete search history.

(56) References Cited

U.S. PATENT DOCUMENTS

| 1,288,126 A | 12/1918 | Muller |
| 2,085,506 A | 6/1937 | McKeown |

(Continued)

FOREIGN PATENT DOCUMENTS

| CN | 1353591 A | 6/2002 |
| CN | 1847111 A | 10/2006 |

(Continued)

OTHER PUBLICATIONS

Office Action issued in corresponding Chinese Patent Application No. 201280050944.9 on Apr. 22, 2015 (in English).

(Continued)

*Primary Examiner* — Joseph Dillon, Jr.
(74) *Attorney, Agent, or Firm* — Birch, Stewart, Kolasch & Birch, LLP

(57) ABSTRACT

A method and apparatus for improving the separating efficiency of a separating device of a pneumatic material conveying system, such as of a waste conveying system, in which the material to be transported, is separated from the transporting air, and/or for preventing blocking of the output aperture for the transporting air of the separating device. The transporting air and the material coming with it are initially brought into a rotating movement in the chamber space of the separating device. The transporting air is deflected in the chamber space of the separating device, and is conducted into the output channel. The flow of transporting air is acted upon in the chamber space of the separating device or in the output channel by bringing about a guiding effect for the transporting air in the opposite direction with respect to its direction of rotation.

10 Claims, 1 Drawing Sheet

(51) Int. Cl.
  *B65F 5/00*   (2006.01)
  *B04C 5/04*   (2006.01)
  *B04C 5/13*   (2006.01)

(56) References Cited

U.S. PATENT DOCUMENTS

| | | | |
|---|---|---|---|
| 2,153,270 A | 4/1939 | Osgood | |
| 2,887,178 A | 5/1959 | Larsson et al. | |
| 3,771,294 A | 11/1973 | Ronning | |
| 4,698,077 A * | 10/1987 | Peltola | D21B 1/345 162/55 |
| 5,221,299 A | 6/1993 | Boring | |
| 5,295,317 A * | 3/1994 | Perrott | E02F 3/925 175/66 |
| 5,681,450 A * | 10/1997 | Chitnis | B01J 8/0055 208/100 |
| 6,394,708 B1 | 5/2002 | Braden | |
| 6,957,740 B2 * | 10/2005 | Hoffmann | B04C 5/103 209/132 |
| 7,316,564 B2 * | 1/2008 | Muschelknautz | B01J 8/0055 122/488 |
| 7,523,831 B2 * | 4/2009 | Ottow | B07B 4/02 209/710 |
| 2008/0047239 A1 * | 2/2008 | Zheng | B01D 45/14 55/337 |
| 2011/0226129 A1 * | 9/2011 | Huziwara | B04C 3/06 95/271 |
| 2012/0080022 A1 * | 4/2012 | Spino | F23C 5/08 126/77 |
| 2015/0033944 A1 * | 2/2015 | Luven | B01D 45/12 95/268 |
| 2015/0135656 A1 * | 5/2015 | Hajash | B04C 5/04 55/345 |

FOREIGN PATENT DOCUMENTS

| | | |
|---|---|---|
| CN | 201236070 Y | 5/2009 |
| DE | 2601425 A1 | 7/1977 |
| DE | 3624086 A1 | 1/1988 |
| EP | 0016936 A1 | 10/1980 |
| JP | 5-168980 A | 7/1993 |
| JP | 06-106677 A | 4/1994 |
| JP | 7-39944 U | 7/1995 |
| JP | 2000-15143 A | 1/2000 |

OTHER PUBLICATIONS

Office Action issued in corresponding European Patent Application No. 12842229.2 on Jul. 1, 2015.

Office Action issued in corresponding Japanese Application No. 2014-536304 on Jul. 12, 2016 (and English translation therof).

Office Action issued in corresponding Russian Application No. 2014119875 on Jul. 22, 2016 (and English language translation thereof).

* cited by examiner

SEPARATING DEVICE AND METHOD FOR A PNEUMATIC MATERIAL CONVEYING SYSTEM

BACKGROUND OF THE INVENTION

1. Field of the Invention

The object of the invention is a method for achieving an effective separation efficiency in which a material being transported is separated from a transporting air flow.

The object of the invention is also an apparatus for achieving an effective separation efficiency wherein a material being transported is separated from a transporting air flow.

2. Description of Background Art

The invention relates generally to pneumatic material conveying systems, such as to partial-vacuum transporting systems, more particularly to the collection and conveying of wastes, such as to the conveying of household wastes. Such systems are presented in publications WO 2009/080880, WO 2009/080881, WO 2009/080882, WO 2009/080883, WO 2009/080884, WO 2009/080885, WO 2009/080886, WO 2009/080887 and 2009/080888, among others.

Pneumatic material conveying systems wherein wastes are conveyed in piping by means of suction, a pressure difference and/or a flow of transporting air are known in the art. Pneumatic pipe transporting systems for material are used, among other things, for the conveying of wastes in different buildings, in institutions or in more extensive areas, e.g. in blocks or city districts it is typical to these systems that a partial-vacuum apparatus is used to achieve a pressure difference, in which apparatus a partial vacuum, a pressure difference and/or a flow of transporting air is achieved in the conveying pipe with partial-vacuum generators, such as with vacuum pumps or with an ejector apparatus or with fans. The wastes transfer from the input point along the piping together with the transporting air into a separating device which is e.g. a cyclone separator or some other tank, in which the material to be conveyed is separated from the transporting air. The transporting air exits from the output aperture for transporting air and the waste remains in the separating device, from where it is removed, e.g. according to need. The transporting air and the waste are typically brought into the chamber of the separating device tangentially, in which case a rotating movement is achieved in the separating chamber and the transporting air and waste to be separated circulate in the separating device typically near the walls, in which case the heavier waste remains in the separating device and the transporting air rises upwards from the center of the cyclone separator. One problem is that papers and thin plastics that are light and have a large surface area can sometimes ascend along with the ascending transporting air flow. There are often waste grades, e.g., waste paper plastic film, plastic bags, et cetera, along with the waste being transported, which waste grades, being unattached and lighter than the other waste, can block the output aperture for the transporting air of the separating device or other tank either partly or completely. A problem with a separating device, such as a cyclone separator or other tank, is therefore that with waste generally e.g. paper and thin plastic try to block the output aperture for the transporting air of the separating device. Problematic waste grades, e.g. paper and plastic, typically have a large surface area and low weight. These often cause problems for a separator because problematic waste grades float very easily to the output aperture for the transporting air. Efforts have been made to solve this problem by using various mechanical means, e.g. rotating brushes, to prevent blockage of the output aperture and, on the other hand, to remove rubbish that has gone into it. These have not, however functioned satisfactorily.

The aim of the present invention is to achieve a completely new type of solution in connection with the separating devices of pneumatic material conveying systems, by means of which solution the drawbacks of prior-art solutions are avoided. Another aim of the invention is to achieve a solution applicable in connection with a pneumatic wastes conveying systems, by the aid of which blocking of the output aperture of a separating device can be prevented more easily than before and, on the other hand, blockages of the output aperture for the transporting air of the separating device can be removed. Yet another aim is to achieve a solution, by means of which the separating efficiency of a separating device can be improved.

BRIEF DESCRIPTION OF THE INVENTION

The invention is based on a concept wherein a flow of transporting air is arranged in a separating device of a pneumatic material conveying system, such that the circulation direction of the input air and of the output air is changed, in which case, as a consequence of this, the passage of waste particles, such as paper or plastic films or bags, into the output aperture for the transporting air and/or the blocking of the output aperture is reduced or prevented.

The method according to the invention is mainly characterized in that in the method the flow of transporting air is acted upon in the chamber space of the separating device or in the output channel by bringing about a guiding effect for the transporting air in the opposite direction with respect to the direction of rotation of said transporting air.

The method according to the invention is also characterized by what is stated in claims 2-9.

The apparatus according to the invention is mainly characterized in that guiding means of the transporting air flow are arranged in the separating device, which guiding means are configured to bring about in the flow of transporting air in the chamber space of the separating device or in the output channel a guiding effect for the transporting air in the opposite direction with respect to the direction of rotation of said transporting air.

The apparatus according to the invention is also characterized by what is stated in claims 11-17.

The solution according to the invention has a number of significant advantages. By acting upon the flow of transporting air in the chamber space of the separating device or in the output channel by bringing about a guiding effect for the transporting air in the opposite direction with respect to its direction of rotation, it is possible to significantly improve prevention of the material to be separated displacing along with the transporting air towards the output channel. In this case e.g. waste particles, such as papers or plastic films or bags, do not go into the output aperture and/or block the output aperture, and a separating device for a pneumatic wastes conveying system that is more operationally reliable than before can be achieved. The desired effect can be achieved by arranging an output branch coupling in the wall of the output channel such that to flow of the transporting air from the output channel into the output branch coupling is achieved in a mainly tangential direction with respect to the wall of the output channel. This can be achieved e.g. by arranging the output branch coupling eccentrically in the output channel. With the solution according to the invention a significant improvement in the operation of a separating device of a pneumatic waste conveying system is achieved in a rather cost-effective manner.

BRIEF DESCRIPTION OF THE FIGURES

In the following, the invention will be described in more detail by the aid of an embodiment with reference to the attached drawings, wherein.

DETAILED DESCRIPTION OF THE INVENTION

In a pneumatic material conveying system, such as in a wastes conveying system, the material fed into the conveying piping from an input point is transported along the conveying piping to a separating device 1, in which the material being transported separates, e.g. due to the dropping of speed and due to centrifugal force, from the transporting air.

Figure 1:
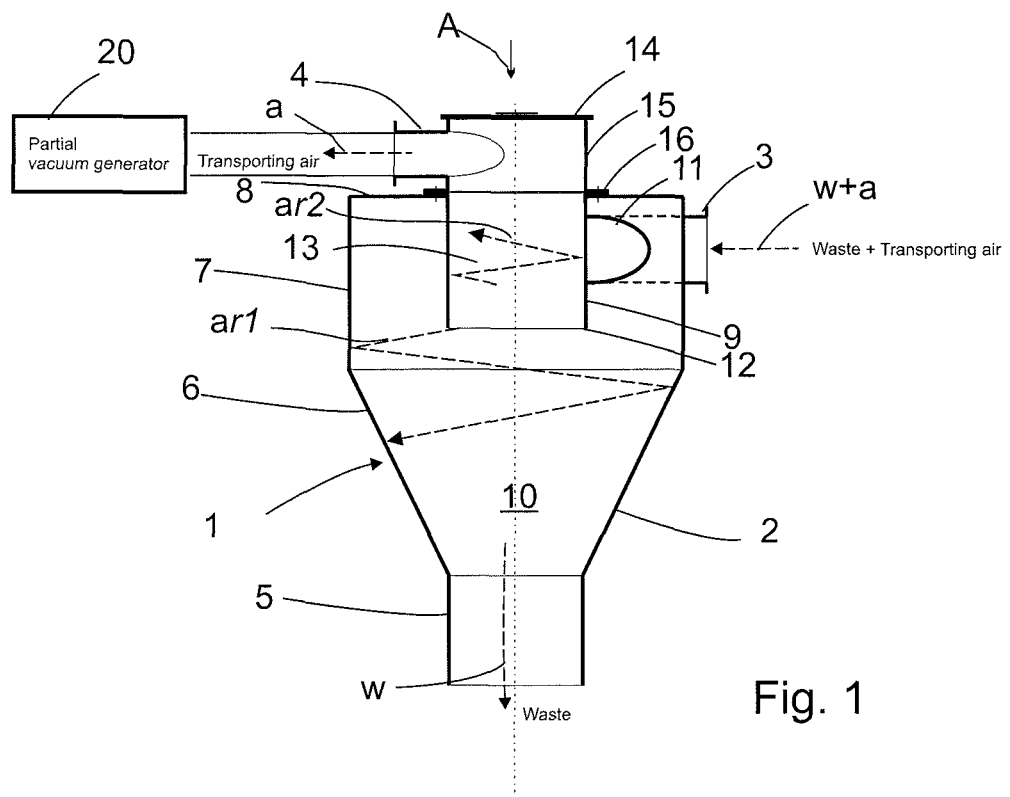
FIG. 1 presents a simplified and sectioned view of a separating device of an embodiment of the invention.

FIG. 1 presents a simplified view of a separating device 1 of a pneumatic material conveying system, more particularly a wastes conveying system, according to an embodiment according to the invention. In the embodiment of the figure, the separating device 1 is a so-called cyclone separator comprising a chamber space 10 that is bounded by walls 2, 8. At its top part 7 the chamber space 10 is wider, mainly cylindrical and tapers conically at its center part towards the bottom part 5. An input branch coupling 3 is connected to the wall 2 of the separating device, to the top part 7 of it, via which branch coupling the material to be transported, such as waste material is conducted together with the transporting air into the chamber space 10 of the separating device from the input aperture 11. The input aperture 11 is arranged in the wall 2 of the chamber space of the separating device, in the top part of its side wall.

Figure 2:
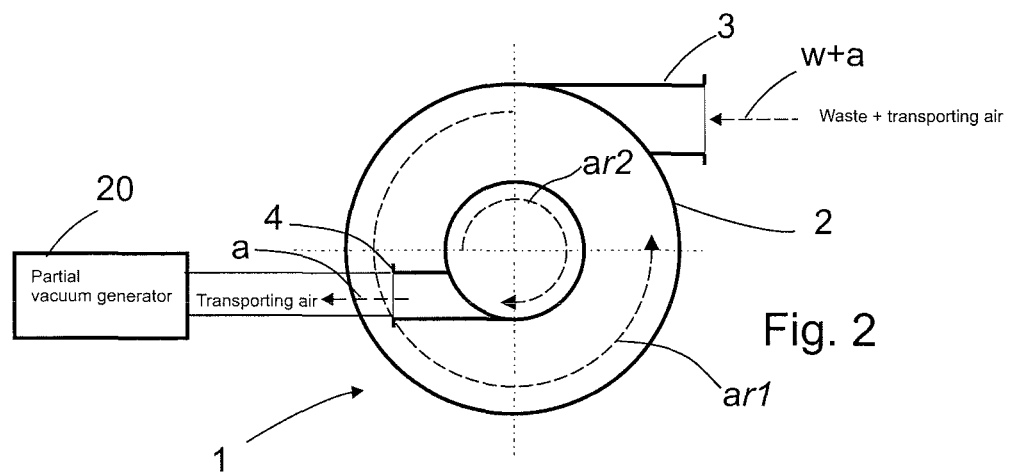
FIG. 2 presents the device of the embodiment of FIG. 1 from the direction of the arrow A.

In the embodiment of the figure, the input aperture 11 of the input branch coupling 3 into the chamber space 10 is arranged in the wall 2 of the separating device, in the top part 7 of said wall, in the area between the butt end wall 8 and the bottom part 12 of the wall 9 of the output channel 12 extending into the inside part of the separating device. The chamber space 10 in the separating device 1 thus comprises as ring-like section in the aforementioned area, in which the wall forms the inner rim of the ring-like section and the wall 2 of the separating device, typically the top part 7 of the wall, forms the outer rim of the ring-like section. In the embodiment of FIGS. 1 and 2, the input branch coupling 3 is arranged in the wall such that the transporting air and the solid particles are fed into a mainly tangential movement in the chamber space 10, in the top part of it.

In the embodiment of the figure, the material, such as waste material, separated from the transporting air drifts to the bottom part 5 of the separating device 1, from where it is removed continuously or from time to time. In FIG. 1, the drifting of the separated material to the bottom pan of the chamber space 10 of the separating device 1 is described with the arrow (w). The separated material is removed e.g. according to need, from the separating device, e.g. via a material output aperture arranged in the bottom part 5 of the chamber space 10 of the separating device.

The transporting air is conducted from the separating device with an output branch coupling 4 for the transporting air. The transporting air is typically deflected in the separating device, in which case the heavier material accompanying the transporting air separates from the transporting air more easily.

In the embodiment of the figure, a wall part 9 is arranged in the top part of the separating device, which wall part extends into the chamber space 10 of the separating device. In the embodiment of the figure, the wall part 9 is cylindrical. In the figure, the wall part is on the same axis as (is coaxial with) the vertical axis of the chamber space 10 of the separating device. An output channel 13 is formed on the inside of the rim of the wall part 9, into which output channel the aperture of the bottom part of the wall 9, i.e. the output aperture 12, leads. There is a connection from the top part of the output channel 13 to the output branch coupling 4 for transporting air.

In the embodiment of the figure, the lower end of the cylindrical wall part 9 is open. An output branch coupling 4 for the transporting air is arranged in the top part 15 of the wall part 9. In the embodiment of the figure, the output channel 13 extends through the top end, such as through the top wall 8, of the separating device, e.g. from an aperture formed in the top wall 8. In the figure, the cylindrical wall part 9 and the output channel 13 comprise a wall section 15 that is outside the top wall 8 of the chamber space 10 of the separating device. The wall section 15 that is outside the wall part 9, preferably outside the chamber space 10 of the separating device, comprises an end plate in its upper end. An output branch coupling 4 for the transporting air is arranged in the top part of the wall part 9. The transporting air is conducted from the chamber space 10 via to output channel 13 of the wall part 9 into the output branch coupling 4. The output branch coupling 4 is, in the embodiment of FIGS. 1 and 2, arranged in the wall section 15 such that the transporting air is exhausted in a mainly tangential movement from the output channel 13, from the top part of it.

A tangential movement has been achieved for the outgoing transporting air in the output channel 13, which movement is preferably in the opposite direction with respect to the tangential movement of the transporting air (and the particles transported along with it) (w+a) in the chamber space 10 of the separating device, at least in the proximity of the input branch coupling 3 in the chamber space 10. The movement of the transporting air in the separating device is roughly illustrated with the arrow a and with w+a, where a presents the movement of the transporting air leaving the separating device and w+a the movement of the transporting air and waste particles coming into the separating device at least in the proximity of the input aperture.

In the separating device, the flow rate of the incoming transporting air flow in the input branch coupling 3 is in one embodiment 15-30 m/s. The speed of the transporting air flow in the output channel is approx. 10-15% of this, i.e. 1.5-5 m/s. Since the transporting air flow and the particles to be separated coming into the separating device are brought tangentially into the chamber of the separating device, a rotating movement of the air flow and the particles to be separated is achieved in the chamber space 10 of the separating device. In this case the air flow in the center of the separating device rotates and this eddy rises into the output channel, in which case the speed of it in the vortex can rise by a multiple factor. To prevent this phenomenon, an output branch coupling 4 is arranged in the top end of the separating device such that it produces, when the suction side of at least one partial-vacuum generator 20 of a pneumatic material conveying system is connected to the output branch coupling 4, a tangential movement (eddy) of the transporting air flow in the output channel 13. The tangential movement of the transporting air flow is thus opposite with respect to the rotation direction of the tangential movement of the transporting air flow coming into the separating device from the input branch coupling 3. In this case the rotating movement of the transporting air flow coming in from the chamber space 10 is neutralized in the output channel 13, or in the proximity of it, and the speed of the transporting air flow decelerates. With this procedure the easy ascent of detrimental particles, such as paper and plastic, along with the transporting air flow from the chamber space 10 of the separating device into the output channel 13 is prevented.

The invention relates to a method for improving the separating efficiency of a separating device 1 of a pneumatic material conveying system, such as of a waste conveying system, in which the material to be transported, such as waste material w, is separated from the transporting air a, and/or for preventing blocking of the output aperture for the transporting air of the separating device, in which method the transporting air and the material coming with it w+a are initially brought into a rotating movement ar1 in the chamber space 10 of the separating device, the transporting air a is deflected in the chamber space 10 of the separating device, and is conducted into the output channel 13. In the method the flow of transporting air is acted upon in the chamber space 10 of the separating device or in the output channel 13 by bringing about a guiding effect for the transporting air in the opposite direction with respect to its direction of rotation ar1.

According to one embodiment a guidance effect is achieved for the transporting air in the output channel 13 in the opposite direction with respect to the rotating movement ar1 of the transporting air being achieved in the chamber space 10 of the separating device.

According to one embodiment a rotating movement ar2 is achieved in the chamber space by conducting with the input branch coupling 3 the transporting air and the material to be separated in a mainly tangential direction with respect to the wall of the chamber.

According to one embodiment the transporting air in the output channel 13 is acted upon by arranging an output branch coupling 4 in the wall 9 of the output channel such that a flow of the transporting air from the output channel 13 into the output branch coupling 4 is achieved in a mainly tangential direction with respect to the wall of the output channel.

According to one embodiment a flow of transporting air is achieved between the input branch coupling 3 and the output branch coupling 4 of the separating device via the chamber space 10 by connecting the output branch coupling 4 to a medium pathway leading to the suction side of a partial-vacuum generator of a pneumatic material conveying system.

According to one embodiment the flow rate of the transporting air is slowed down between the input branch coupling 3 and the output branch coupling 4.

According to one embodiment the output channel 13 is arranged coaxially with the vertical axis of the separating device 1.

According to one embodiment the separating device 1 is a cyclone separator.

According to one embodiment the separating device 1 is a separating device or waste tank of a pneumatic wastes conveying apparatus.

The invention also relates to an apparatus for improving the separating efficiency of a separating device of a pneumatic material conveying system, in which the material to be transported, such as waste material w, is separated from the transporting air a, and/or for preventing blocking of the output aperture for the transporting air of the separating device, which separating device 1 comprises a chamber space 10, and also an input branch coupling 3 for the material to be transported and the transporting air, means for bring the transporting air and the material corning with it w+a initially into a rotating movement an in the chamber space 10 of the separating device, means for deflecting the transporting air a in the chamber space 10 of the separating device and for conducting said transporting air into the output channel 13. Guiding means of the transporting air flow are arranged in the separating device 1, which guiding means are configured to bring about in the flow of transporting air in the chamber space 10 of the separating device or in the output channel 13 a guiding effect for the transporting ar1 air in the opposite direction with respect to its direction of rotation ar1.

According to one embodiment the guiding means of the transporting air flow comprise an output branch coupling 4, which is arranged eccentrically in the wall of the output channel 13.

According to one embodiment the output branch coupling 4 is arranged in the wall 9 of the output channel 13 in a manly tangential direction with respect to the wall of the output channel.

According to one embodiment the output channel 13 is arranged coaxially with the vertical axis of the separating device 1.

According to one embodiment the output channel 13 is mainly cylindrical and open at its bottom part 12.

According to one embodiment the separating device is configured to be connected from the output branch coupling 4 to a medium pathway leading to the suction side of a partial-vacuum generator of a pneumatic material conveying system.

According to one embodiment the separating device 1 is a cyclone separator.

According to one embodiment the separating device 1 is a separating device or waste tank of a pneumatic wastes conveying apparatus.

It is obvious to the person skilled in the art that the invention is not limited to the embodiments presented above, but that it can be varied within the scope of the claims presented below. The characteristic features possibly presented in the description in conjunction with other characteristic features can also, if necessary, be used separately to each other.

The invention claimed is:

1. A method for achieving an effective separation efficiency in which a material being transported is separated from a transporting air flow, comprising the following steps:
   tangentially introducing the transporting air flow and the material to a separating device, relative to a wall of the separating device, thereby creating a rotational movement of the transporting air flow and the material in the chamber space of the separating device;
   deflecting the flow of the transporting air flow in the chamber space of the separating device to an output channel with a direction of rotation that is opposite to the direction of rotation in the chamber space; and
   withdrawing, by partial vacuum, the transporting air flow from the output channel by creating a tangential flow of the transporting air flow from the output channel, relative to the wall of the output channel, thereby facilitating said opposite direction of rotation of the transporting air flow in the chamber space.

2. The method according to claim 1, wherein a guidance effect is achieved for the transporting air flow in the output channel in the opposite direction with respect to the rotating movement of the transporting air flow being achieved in the chamber space of the separating device.

3. The method according to claim 1, wherein a flow of transporting air flow is achieved between the input branch coupling and the output branch coupling of the separating device via the chamber space by connecting the output branch coupling to a medium pathway leading to the suction side of a partial-vacuum generator of a pneumatic material conveying system.

4. The method according to claim 1, wherein the flow rate of the transporting air flow is sheared down between the input branch coupling and the output branch coupling.

5. The method according to claim 1, wherein the output channel is arranged coaxially with the vertical axis of the separating device.

6. The method according to claim 1, wherein the separating device is a cyclone separator.

7. The method according to claim 6, wherein the separating device is a separating device or waste tank of a pneumatic wastes conveying apparatus.

8. The method according to claim 2, wherein a rotating movement is achieved in the chamber space by conducting with the input branch coupling the transporting air flow and the material to be separated in a mainly tangential direction with respect to the wall of the chamber.

9. The method according to claim 2, wherein a flow of transporting air flow is achieved between the input branch coupling and the output branch coupling of the separating device via the chamber space by connecting the output branch coupling to a medium pathway leading to the suction side of a partial-vacuum generator of a pneumatic material conveying system.

10. The method according to claim 2, wherein the flow rate of the transporting air flow is sheared down between the input branch coupling and the output branch coupling.

* * * * *